Dec. 17, 1957  A. L. FASTH  2,816,558
WASHING-UP APPARATUS
Filed Jan. 31, 1956  2 Sheets-Sheet 1
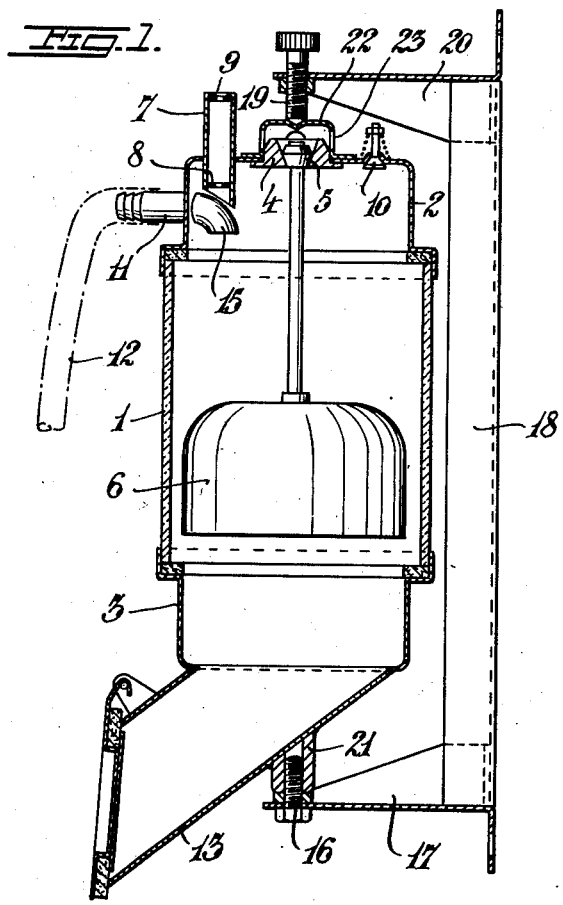
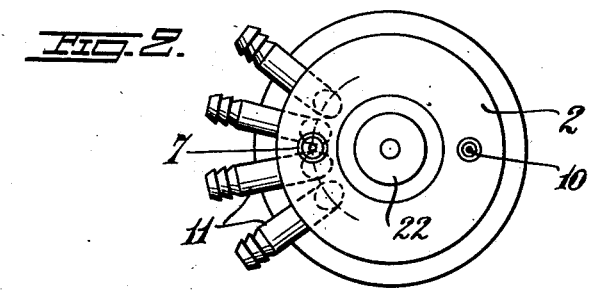
Inventor
Axel Lennart Fasth
by Sommers & Young
Attorneys Dec. 17, 1957  A. L. FASTH  2,816,558
WASHING-UP APPARATUS
Filed Jan. 31, 1956
2 Sheets-Sheet 2
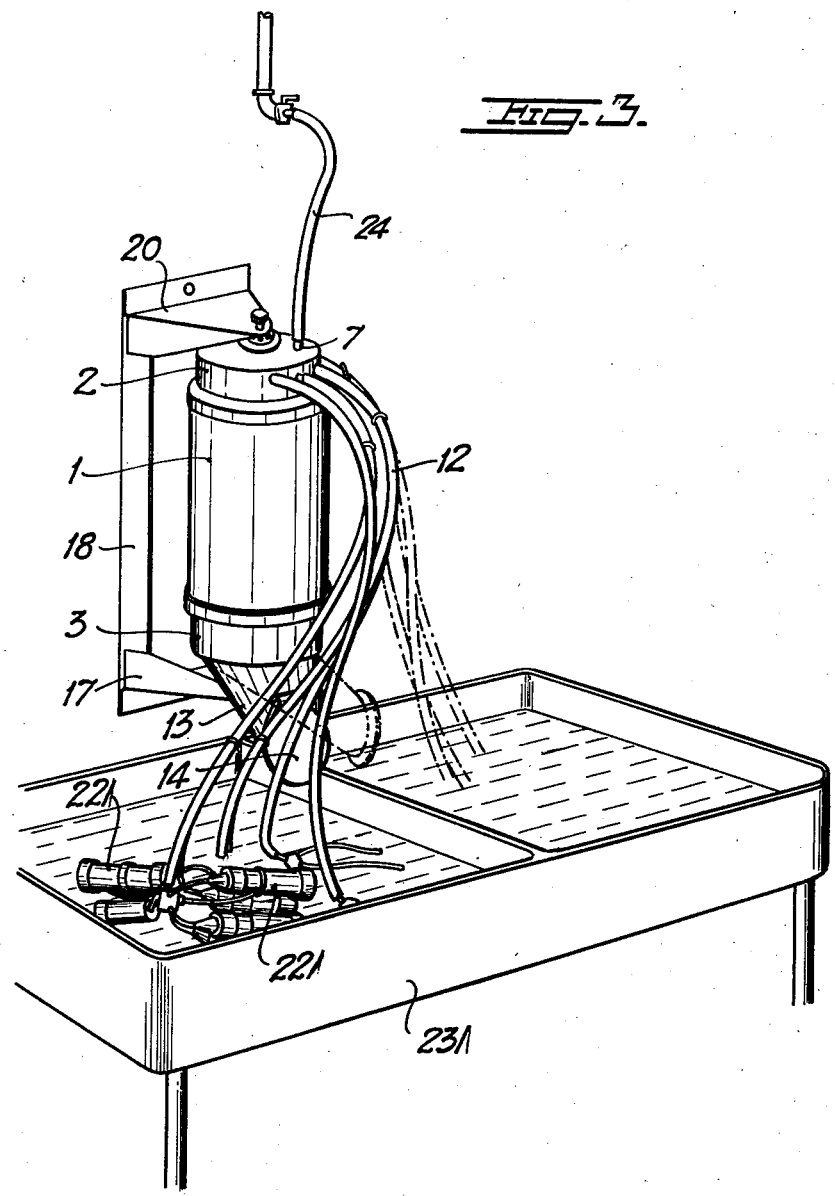

United States Patent Office 2,816,558
Patented Dec. 17, 1957

2,816,558

WASHING-UP APPARATUS

Axel Lennart Fasth, Norrkoping, Sweden, assignor to Aktiebolag Manus, Norrkoping, Sweden Application January 31, 1956, Serial No. 562,568

Claims priority, application Sweden February 8, 1955

3 Claims. (Cl. 134—56)

The present invention relates to a washing-up apparatus, especially for cleansing teat cup units of milking machines.

The object of the invention is to provide an apparatus of said kind by means of which water mixed with a washing extract may be passed through the teat cups and the associated milk tubes with the use of vacuum as source of power.

More particularly, the invention has reference to that type of washing-up apparatus which comprises a receptacle having at its top a float controlled air valve and at its bottom an outlet valve operating under the control of the difference between the outer and the inner pressures acting thereon. Provided at the top of the receptacle are, except said air valve, a connecting branch for a vacuum tube and a plurality of connecting branches for milk tubes extending from teat cup units placed in an open-topped vessel or trough situated below the receptacle which is filled with water and a suitable washing extract mixed therewith. If in the closed state of the air valve, that is to say, with the float in its lowermost position, the interior of the receptacle be subjected to a vacuum, the washing liquid will be drawn by suction from the trough up through the teat cups and the milk tubes connected thereto and delivered into the receptacle. In the meantime the outlet valve will be held in closed state by the action of the atmospheric pressure against the action of the washing liquid collected in the receptacle. The flow of washing liquid through the teat cups and the associated milk tubes will thus continue without interruption until the liquid within the receptacle has reached such a high level as to raise the float and cause it to open the air valve. As a result, the vacuum inside the receptacle ceases, thereby allowing the washing liquid therein, which is now subjected to the atmospheric pressure, to open the discharge valve by its increased weight and allow the washing liquid to again flow down into the trough. According as the liquid is discharged the float sinks and closes the air valve, whereupon the described course of operation is repeated.

In already known apparatus operating on this principle it has been proved that foam resulting from the washing liquid may rise up into the vacuum tube connecting branch and pass therethrough into the vacuum tube to further reach the main vacuum conduit and give rise to drawbacks therein. It is an object of the invention to avoid such drawbacks.

To this end according to a feature of the invention the milk tube connecting branches of the receptacle comprise pipes extending through the wall of the receptacle the inner ends of which, inside the receptacle, are curved downwardly, so that the liquid drawn by suction up through the milk tubes and delivered to the receptacle via the connecting pipes, will not be subjected to any abrupt changes of direction but is led as uniform flows towards the top of the float to be spread thereby as a thin film passing along the peripheral surface of the float down into the liquid already contained in the receptacle. In hitherto known apparatus the washing liquid drops from the connecting branches directly onto the liquid level in the receptacle, thereby considerably increasing the formation of foam inside the receptacle.

Another feature of the invention involves mounting said downwardly curved inner ends of the milk tube connecting pipes in close proximity to each other along an arc of a circle concentric with the axis of the receptacle, and providing the vacuum tube connecting branch immediately above said curved pipe ends, the bottom end of the vacuum tube connecting branch being obliquely cut so as to suit very nearly to the inclination of the curved pipe ends.

By these features it has proved possible to obtain a space practically free from foam near the top of the receptacle above the downwardly facing mouths of the curved pipe ends. As a result, the foam can never reach the vacuum tube connecting branch and enter thereinto.

Provided at the top of the receptacle is a spring-loaded safety valve for allowing entrance of atmospheric air into the receptacle, should the vacuum therein sink below the value predetermined.

Another object of the invention is to permit an easy use of the apparatus in combination with a usual sink, divided by a partition into two spaces, viz. one containing a washing liquid and the other containing rinsing-water. To this end the receptacle is rotatably mounted in a frame, in which it may be rotated about a vertical axis and locked against rotation for bringing the discharge outlet of the receptacle into position above one or the other of said spaces.

In the accompanying drawing, Fig. 1 is a vertical section and Fig. 2 is a top plan view, with certain parts removed, of an embodiment of the invention. Fig. 3 is a perspective view of a complete washing plant including an apparatus according to Figs. 1 and 2.

With reference especially to Fig. 1, the apparatus shown comprises a receptacle including a glass cylinder 1 inserted between two metallic end members, viz. a top member 2 and a bottom member 3. The top member acts as a cover for the receptacle. Provided in its middle is a conical seat 4 engaged by an outwardly opening air valve 5 the stem of which depends into the receptacle to carry a float 6. Provided in the cover is further a connecting branch 7 for receiving a vacuum tube, not shown. Said connecting branch 7 comprises a pipe piece having a bottom wall 8 with an opening and a top wall 9 likewise formed with an opening. Preferably, the opening of the top wall 9 may be slightly smaller than that of the bottom wall. Provided in the cover 2 of the receptacle is also a safety valve including a spring-loaded, inwardly opening air admission valve 10.

At that side of the cover 2 where the vacuum tube connecting branch 7 is located, the peripheral wall of the cover carries a number of connecting branches 11 for receiving the milk tubes each of which is associated with a teat cup unit (not shown) to be rinsed, see also Fig. 2. In Fig. 1 there are four such connecting branches shown. Thus, in the example shown four teat cup units and their associated milk tubes may be rinsed simultaneously. In Fig. 1 one milk tube is shown by dotted lines at 12.

During the rinsing operation the teat cup units as shown at 22 in Fig. 3 are positioned in a trough or in an open-topped vessel as a trough 23, Fig. 3 containing a washing liquid consisting, for instance, of water and a suitable washing extract. The receptacle 1 should be placed at a suitable height above said trough so as to allow the discharge of liquid from the receptacle out into the trough by way of the outlet 13 formed integrally with the bottom 3 member of the receptacle or rigidly connected thereto. The delivery end of outlet 13 is normally closed by a damper 14 so arranged as to be controlled by the difference in the pressures acting on both sides thereof.

The milk tube connecting pipes 11 extend into the receptacle where they are curved downwardly and situated close by each other so that the centres of their lower ends are positioned on an arc concentric with the axis of the receptacle, as indicated in Fig. 2, with said ends pointing against the bell-shaped top of the float 6. The vacuum tube connecting branch 7 is situated substantially above the middle point of said arc, as shown in Fig. 2, the lower end of branch 7 being obliquely cut in substantial conformity with the inclination of the curved inner portions 15 of pipes 11, as shown in Fig. 1.

The receptacle 1—3 is mounted to rotate about a central vertical axis. In the example shown this axis is represented, in part, by a lower pivot pin 16 supported by a horizontal lower arm 17 of a frame 18 and, in part, by an upper pivot pin 19 attached to a horizontal upper arm 20 of said frame. The lower pivot pin 16 engages a bushing 21 welded to the under side of outlet 13, and the upper pivot pin 19 engages by its tapered lower end a conical depression formed in the middle of a cap 22 positioned on the top member 2 of the receptacle as a protection for the float controlled air inlet valve 5. Said cap is formed with lateral openings 23 leading to the atmosphere. Both pivot pins 16 and 19 may be formed with threads for engaging nut-like members of the supporting arms 17 and 20. The upper pivot pin 19 may, preferably, be such a length as to allow it to be used as a locking screw for fixing the receptacle in any angular position desired or for exerting such a degree of friction on the cap 22 as to allow rotation of the receptacle to the position desired while securely maintaining it in adjusted position.

In operation, the conducting branch 7 is connected to a vacuum source, such as the stationary vacuum system of a milking machine plant, by means of a flexible tube as shown at 24 in Fig. 3. By this means the receptacle is evacuated causing washing liquid contained in the trough 231 to be drawn by suction up through the teat cup units 221 immersed in said liquid and the associated milk tubes 12 and delivered via the connecting pipes 11 and their bends 15 to the interior of the receptacle. The liquid delivered from the bends 15 drops onto the bell-shaped top of float 6 and flows as a thin film along the side wall of the float down into the lower portion of the receptacle gradually filling the outlet 13, the bottom member 3 and the body portion 1 of the vessel. Because of the distribution of the liquid as a thin film by means of the float the pouring of the liquid into the receptacle will not cause any formation of foam. As long as a vacuum exists in the receptacle the atmospheric pressure acting on the outer surface of the damper 14 is capable of maintaining the damper in closed state against the pressure acting on the inner surface of the damper which is due to the weight of the liquid in the receptacle. When the liquid inside the receptacle reaches such a level as to raise the float 6, the air outlet valve 5 opens, allowing atmospheric air to enter into the receptacle and destroy the vacuum therein. As a result, the flow of liquid into the receptacle through pipe bends 15 ceases and the outlet damper 14 opens under the action of the liquid in the receptacle, which is now increased by the atmospheric pressure. Through the opened damper 14 the liquid in the receptacle is discharged into the trough therebelow. As the liquid is thus discharged from the receptacle the float therein sinks to its normal position with resulting closure of the air valve 5. Immediately as the air valve 5 closes, the receptacle is again evacuated and the course described begins again.

If the washing operation is carried out with the use of a sink having two spaces separated by a partition as shown in Fig. 3, one of which contains a washing liquid and the other contains rinsing water, the rotatable mounting of the receptacle permits an easy setting of the receptacle to the position, in which its liquid outlet 13 is situated above the space of the sink in which the teat cup units are placed for the time being. By dotted lines are shown the outlet 13 and the tubes 12 as leading to the other space of the sink.

Practice has proved that because of the arrangement of the vacuum tube connecting branch 7 in the manner described no foam at all may be drawn by suction up into said connecting branch and into the vacuum conduit in connection therewith. Due to this fact any washing extracts desired may be used, even those having a violent foam producing power, without the risk of foam entering into the vacuum conduit.

The vacuum tube connecting branch 7 acts because of its bottom and top walls 8 and 9 and the openings therein as an equalizing chamber, so that changes of the degree of vacuum occurring in the vacuum conduit will not at all or only to a very little extent appear in the receptacle. By suitable adjustment of the size of the openings in the end walls of the connecting branch 7 with relation to each other the pressure equalizing effect may be controlled. If desired, more than two perforated partitions may be provided in the connecting branch 7 in case an increased number of pressure equalizing chambers and a better pressure equalizing effect is desired.

I claim:

1. A washing-up apparatus, especially for rinsing teat cup units and associated milk tubes of milking machines comprising in combination, an airtightly closeable receptacle including a cylindrical peripheral wall, a bottom member and a top member, an air inlet valve in said top member, a float in the receptacle for controlling said air valve, a set of connecting pipes extending through the side wall of said top member, the outer ends of said connecting pipes being adapted to receive the milk tubes of the teat cup units to be rinsed, and the inner ends of said connecting pipes being curved downwardly with their downwardly facing mouths situated close by each other along an arc concentric with the axis of the receptacle, and a vacuum tube connecting branch provided at the top member of the receptacle, said connecting branch including a pipe extending downwardly through the top surface of said top member with its lower end positioned substantially above the middle of said arc and obliquely cut substantially in conformity with the inclination of the curved inner ends of the milk tube connecting pipes.

2. A washing-up apparatus, especially for rinsing teat cup units and associated milk tubes of milking machines comprising in combination, an airtightly closeable receptacle including a glass cylinder, a metallic bottom member, a tubular liquid discharge member formed integrally with said bottom member, a valve for said outlet adapted to be controlled by the difference between the atmospheric pressure acting on the outer surface of said valve and the pressure of the liquid contained in the receptacle, a metallic top member forming a cover for the receptacle, an air inlet valve in said top member, a bell-shaped float in the receptacle for controlling said air valve, a spring-loaded air inlet valve in said top member adapted to be opened by the atmospheric pressure at a predetermined vacuum inside the receptacle, a set of connecting pipes extending through the side wall of said top member, the outer ends of said connecting pipes being adapted to receive the milk tubes of the teat cup units to be rinsed, and the inner ends of said connecting pipes being curved downwardly with their downwardly facing mouths situated close by each other along an arc concentric with the axis of the receptacle, and at least two perforated partitions in said pipe to form at least one pressure equalizing chamber therein.

3. A washing-up apparatus of the class specified comprising in combination, an airtightly closeable receptacle, means for connecting said receptacle to a vacuum conduit, means for delivering to the receptacle a washing liquid that has passed through a set of teat cup units and associated milk tubes, an air inlet valve at the top of the receptacle, a float inside the receptacle for opening said valve upon the attainment of a predetermined liquid level in the receptacle, another air inlet valve at the top of the receptacle adapted to be opened by the atmospheric pressure at too far extended vacuum inside the receptacle, an obliquely downwardly directed liquid outlet at the bottom of the receptacle, a damper for controlling said outlet, said damper being controllable by the difference in the pressures acting on opposite surfaces of the damper, a stationary frame for supporting the receptacle, means for rotatably mounting the receptacle in said frame, and means for locking the receptacle in desired angular position.

References Cited in the file of this patent

UNITED STATES PATENTS

| | | |
|---|---|---|
| 1,328,657 | Fish | Jan. 20, 1920 |
| 1,645,356 | Shurts | Oct. 11, 1927 |
| 1,737,794 | Henderson | Dec. 3, 1929 |
| 2,342,995 | Ballentine | Feb. 29, 1944 |